United States Patent [19]

Bennett

[11] Patent Number: 4,794,485

[45] Date of Patent: Dec. 27, 1988

[54] VOLTAGE SURGE PROTECTOR

[75] Inventor: John C. Bennett, Hampton, Va.

[73] Assignee: Maida Development Company, Hampton, Va.

[21] Appl. No.: 73,188

[22] Filed: Jul. 14, 1987

[51] Int. Cl.[4] .......... H02H 3/20

[52] U.S. Cl. .......... 361/127; 361/56; 361/91; 361/118; 361/356; 174/53; 439/622

[58] Field of Search .......... 361/117, 118, 119, 126, 361/127, 56, 91, 111, 86, 334, 356; 174/52 R, 52 PE, 52 FP, 53, 54, 58, 59; 439/181; 240/662, 660

[56] References Cited

U.S. PATENT DOCUMENTS

| | | | |
|---|---|---|---|
| 2,277,216 | 12/1939 | Epstein | 333/181 |
| 3,693,053 | 9/1972 | Anderson | 361/434 |
| 3,707,697 | 12/1972 | Izumi | 439/107 |
| 3,746,877 | 7/1973 | Seiter et al. | 307/66 |
| 3,821,686 | 6/1974 | Harnden, Jr. | 338/21 |
| 3,987,343 | 10/1976 | Cunningham et al. | 361/56 |
| 4,071,872 | 1/1978 | Phillips, Jr. | 361/56 |
| 4,075,676 | 2/1978 | Phillips, Jr. | 361/56 |
| 4,217,619 | 8/1980 | Tibolla | 361/56 |
| 4,282,557 | 8/1981 | Stetson | 361/117 |
| 4,320,436 | 3/1982 | Bushnell | 361/127 X |
| 4,405,188 | 9/1983 | Schwartz | 439/70 |
| 4,420,214 | 12/1983 | Wu | 439/622 |
| 4,439,807 | 3/1984 | Reitz | 361/127 |
| 4,480,891 | 11/1984 | Wu | 439/622 |
| 4,500,160 | 2/1985 | Bertsch | 439/56 |
| 4,688,135 | 8/1987 | Leopold | 361/56 X |

*Primary Examiner*—A. D. Pellinen
*Assistant Examiner*—Derek S. Jennings
*Attorney, Agent, or Firm*—Finnegan, Henderson, Farabow, Garrett & Dunner

[57] ABSTRACT

A device for suppressing transient surges in electrical power available from an electrical outlet is disclosed. The device is adapted for mounting on a back side portion of the electrical outlet. Surge protection components, such as planar varistors are disposed within an insulative housing block which forms the body of the device, and the device is physically mounted and electrically connected to the electrical outlet by mounting apparatus such as stiff metal leads.

18 Claims, 2 Drawing Sheets

VOLTAGE SURGE PROTECTOR

BACKGROUND OF THE INVENTION

I. Field of the Invention

This invention relates to an electrical surge protection device for protecting electrical applicances from transient voltage surges. Specifically, the present invention is an electrical surge protection device adapted for removable, external mounting on the back side portion of any of various types of electrical outlets, such as standard electrical wall outlets.

II. Background Information

A variety of electrical surge protection devices for use in conjunction with or for inclusion within electrical outlets are known. Known or conventional electrical surge protection devices typically include surge protection components such as varistors. One type of conventional electrical surge protection device is the type illustratively disclosed in the following U.S. Patents: U.S. Pat. Nos. 4,480,891 to Wu; 4,500,160 to Bertsch; 4,420,214 to Wu; 4,075,676 and 4,071,872 to Phillips, Jr. Surge protection devices of the type disclosed in the above-cited patents are referred to as "intermediate" receptacles, so named because a device of this type is positioned between an appliance being protected and a front plate covering or front side portion of an electrical outlet.

More specifically, electrical appliances for which surge protection is to be provided are plugged into female contacts of an intermediate receptacle. Prongs of the intermediate receptacles are then plugged into the front of an electrical outlet to electrically connect the electrical appliances to the electrical outlet. The surge protection elements of the intermediate receptacle protect the electrical appliances from transient voltage surges in the voltage available at the electrical outlets.

Since a surge protection device of the intermediate receptacle variety is plugged into the front of an electrical outlet, one of these surge protection devices may be readily removed, at any time, from between an electrical appliance and the electrical outlet. An unknowing person may remove the device, or it may be removed inadvertently when the appliance is unplugged. Subsequently, an electrical appliance may be plugged directly into the wall outlet and used without the benefit of surge protection, and with the quite undesirable result that the appliance may be damaged by transient voltage surges.

Another type of conventional electrical surge protection device is illustratively disclosed in U.S. Pat. No. 4,217,619 to Tibolla. The type of surge protection device disclosed in Tibolla is designed to be mounted within an electrical outlet.

Surge protection devices which are mounted in wall outlets avoid the undesirable result which may be experienced with intermediate receptacle surge protection devices due to the fact that an intermediate receptacle may be readily removed from the front of an electrical outlet. That is, since the internally-mounted surge protection devices are internally mounted, and not plugged into the front of an electrical outlet, a surge protection device of this type cannot be readily removed from the front of the electrical outlet, and thus electrical appliances to be plugged into the electrical outlet can not be readily left unprotected from transient voltage surges. However, internal mounting of a surge protection device within an electrical outlet requires significant modification of the electrical outlet. For example, in order to make space for the surge protection device within the electrical outlet, it may be required to remove one of a pair of female receptacles of the electrical outlet as shown by Tibolla.

Another type of conventional surge protection device is disclosed in U.S. Pat. No. 4,439,807 to Reitz. The device disclosed in Reitz is a surge protector which is embodied in a triangular shaped housing. A threaded structure protrudes from the triangular housing, and this threaded structure is used to mount the surge protection device. The type of structure to which this surge protection device can be mounted must also be threaded. Accordingly, substantial modification of an electrical outlet is also required in order to mount the Reitz surge protection device to the electrical outlet.

SUMMARY OF THE INVENTION

A need therefore exists for providing a surge protection device which is not readily removable from the front of an electrical outlet, yet which require no modification of the electrical outlet. Accordingly, an object of the present invention is to provide a suree protection device which is not readily removable from the front of an electrical outlet, thereby ensuring that voltage surge protection will be provided for any electrical appliance which uses that given outlet.

Another object of the present invention is to provide a surge protection device which may be used with an unmodified electric outlet.

Yet another object of the present invention is to provide a surge projection device which, although not readily removable from the front of an electrical outlet during ordinary usage, is conveniently mounted to the electrical outlet.

Additional objects and advantages of the invention will be set forth in the description which follows, and in part, will be obvious from the description or may be learned by practice of the invention.

To achieve the foregoing objects, and in accordance with the purpose of the invention as embodied and broadly described herein, there is provided a device for suppressing transient surges in electrical power available from an electrical outlet having power circuit connection terminals, a ground terminal, a back side portion, and disposed in a housing structure, said device comprising: an insulative housing block having a depth sufficiently thin to allow placement of said insulative housing block between said back side portion and said housing structure, the depth of said insulative housing block being defined in a direction transverse to an elongated plane through said insulative housing block, for mounting on the back side portion of the electrical outlet with said elongated plane of said insulative housing block being parallel to the back side portion of the electrical outlet; surge protection means for suppressing the transient electrical power surges, said surge protection means being disposed within said insulative housing block; and mounting means for physically mounting said insulative housing block to the electrical outlet, and for electrically connecting said surge protection means to the power circuit connection terminals and the ground terminal.

DESCRIPTION OF THE PREFERRED EMBODIMENT

Figure 3:
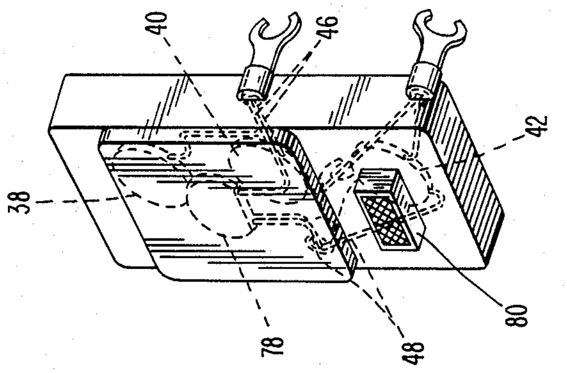
FIG. 3 is a perspective view of a third preferred embodiment of a surge protection device according to the present invention.

The preferred embodiments of a surge protection according to the present invention will now be explained with reference to FIGS. 1-3. Throughout the drawings, like reference characters will be used to indicate like elements.

Figure 1:
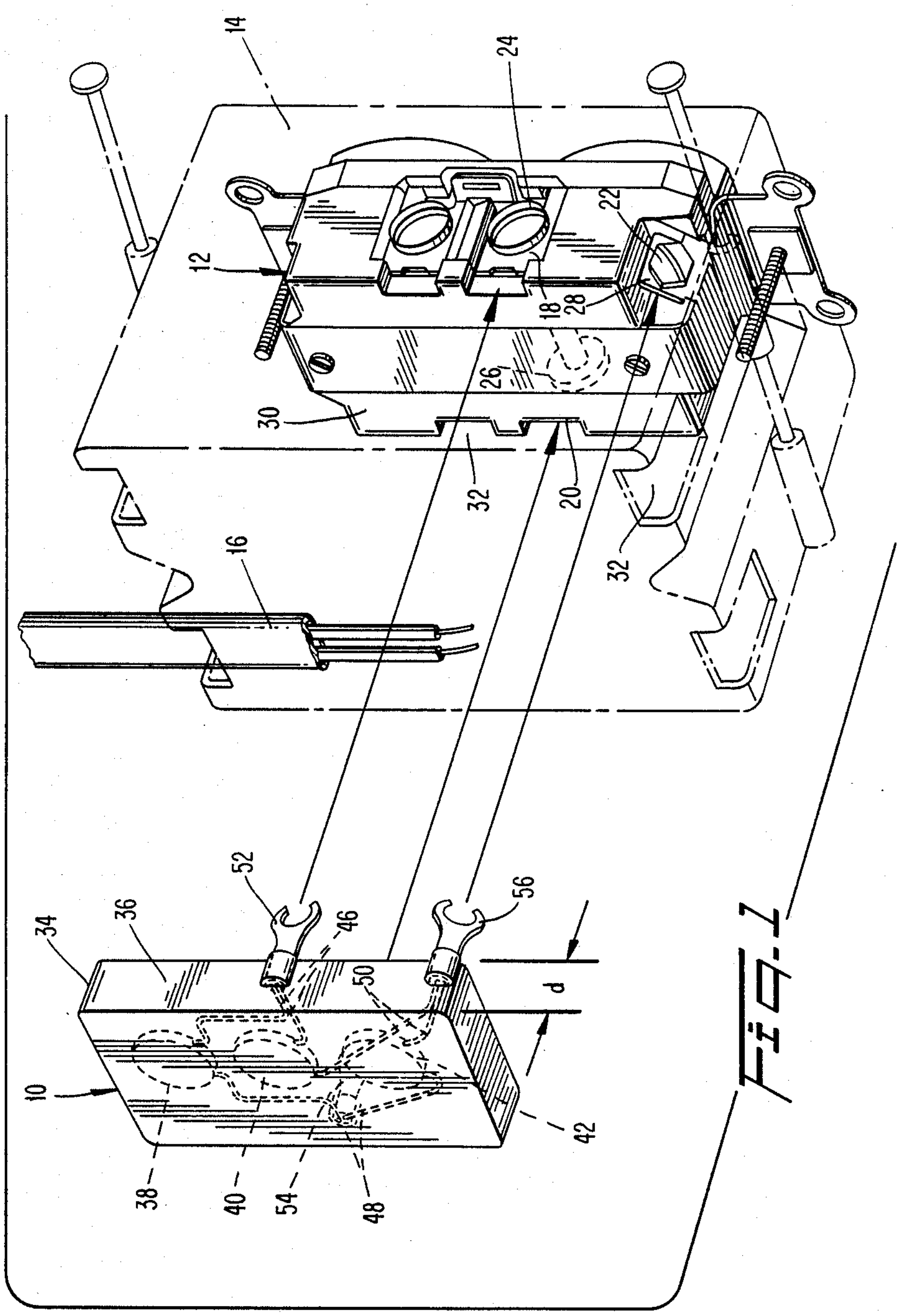
FIG. 1 is a perspective view of a preferred embodiment of a surge protection device according to the present invention and an electrical outlet to which the surge protection is to be mounted.

Referring to FIG. 1, a preferred embodiment of the present invention is described. In FIG. 1, a device 10 for suppressing transient surges in electrical power available from an electrical outlet 12 is shown. Electrical outlet 12 is a standard electrical wall outlet of a type generally available for use in providing power to electrical appliances or to other devices needing electrical power to operate.

Electrical outlet 12 is typically located within a housing or box 14. Housing 14 provides a means for affixing electrical outlet 12 within a wall (not shown), and provides a protective environment for connections made from a power line 16 to electrical outlet 12. Electrical outlet 12 includes power circuit connection terminals 18 and 20. Power circuit connection terminal 18 is a "hot" connection terminal, and power circuit connection terminal 20 is a "neutral" connection terminal. Electrical outlet 12 also includes a ground terminal 22.

Terminals 18, 20 and 22 are located on sides of electrical outlet 12 and compriee means for respectively securing hot, neutral and ground leads from power line 16 to terminals 18, 20 and 22 of electrical outlet 12. The means for securing the power line leads may comprise, for example, binding head screws 24, 26 and 28 threadedly engaged at terminals 18, 20 and 22 of electrical outlet 12.

Electrical outlet 12 also has a back side portion 30 with a face external to electrical outlet 12. An open space 32 exists between back side portion 30 and housing apparatus 14. Outlets of the foregoing type are known and are commercially available from Pass and Seymour Company of Syracuse, N.Y. under the name PS5242, for example.

According to the invention, device 10 comprises an insulative housing block 34 having a thin depth d. Depth d of housing block 34 is defined in a direction transverse to an elongated plane through housing block 34, as shown in FIG. 1. Depth d of housing block 34 is preferably of a sufficiently large dimension to enable surge protection means in the form of planar-type varistors to be disposed within insulative housing block 34. Varistors for use as surge protection means in accordance with the present invention are further described below. Depth d is preferably also sufficiently small to enable insulative housing 34 to be disposed in open space 32 between back side portion 30 of electrical outlet 12 and housing 14 in a manner described in detail below. Specifically, depthdd of housing block 34 is preferably between 5/16 and ½ inches, although other dimensions could be used depending upon the varistors employed and/or the spacing between outlet 12 and housing 14.

According to a presently preferred embodiment, an insulative potting compound 36 is included in housing block 34. Insulative potting compound 36 provides electrical insulation for varistors or other electrical components disposed in insulative housing block 34.

In accordance with the present invention surge protection means, which may, as mentioned above, comprise flat planar type varistors, are disposed within insulative housing block 34 and are the specific components utilized to suppress electrical power surges available from electrical outlet 12. Preferably, three flat planar varistors 38, 40 and 42 are utilized for the surge protection means. Each varistor 38, 40 and 42 has a first end and a second end. Varistors 38, 40 and 42 are arranged in a manner such that the first end of varistor 38 is available for connection to hot connection terminal 18 of electrical outlet 12 and the second end of varistor 38 is connected to neutral connection terminal 20 of outlet 12, the first end of varistor 40 is available for connection to hot connection terminal 18 of electrical outlet 12 and the second end of varistor 40 is connected to ground terminal 22 of outlet 12, and the first end of varistor 42 is available fo connection to ground terminal 22 of electrical outlet 12 while the second end of varistor 42 is connected to the neutral connection terminal 20.

Surge protection circuits of the foregoing type are wellknown and need not be described further for purposes of understanding the present invention. Other types of circuits may also be employed without departing from the spirit or scope of the invention. These circuits may be utilized provided they are of a size sufficient to permit encapsulation within housing 3 which is then fitted into space 32 behind outlet 12.

Insulative housing block 34 is adapted to be disposed adjacent back side portion 30 of electrical outlet 12 in open space 32 between electrical outlet 12 and housing apparatus 14. Specifically, insulative housing block 34 is adapted for mounting with the elongated plane of insulative housing block 30 parallel to back side portion 30 of electrical outlet 12 as depicted in FIG. 1.

According to the present invention, insulative housing block 34 is mounted adjacent electrical outlet 12 by mounting means. In a preferred embodiment, the mounting means comprises leads 46, 48 and 50, and contacts 52, 54 and 56. Leads 46, 48 and 50 link ends of varistors 38, 40 and 42 to contacts 52, 54 and 56 which are respectively positioned around terminals 18, 20 and 22 and secured to terminals 18, 20 and 22 by binding head screws 24, 26 and 28. Accordingly, leads 46, 48 and 50 and contacts 52, 54 and 56 provide means for physically mounting insulative housing 34 to electrical outlet 34, and for electrically connecting the surge protection means of device 10 disposed in insulative housing block 34 to electrical outlet 12.

Leads 46, 48 and 50 need not be indirectly connected to terminals 18, 20 and 22 by means of oontacts 52, 54 and 56, but may be directly connected to terminals 18, 20 and 22. If leads 46, 48 and 50 emerging from insulative housing block 34 are sufficiently stiff to support the weight of housing black 34 in a fixed manner, leads 46, 48 and 50 may be situated around terminals 18, 20 and 22 and secured by binding head screws 24, 26 and 8 to physically mount and electrically connect device 10 to electrical outlet 12.

Figure 2:
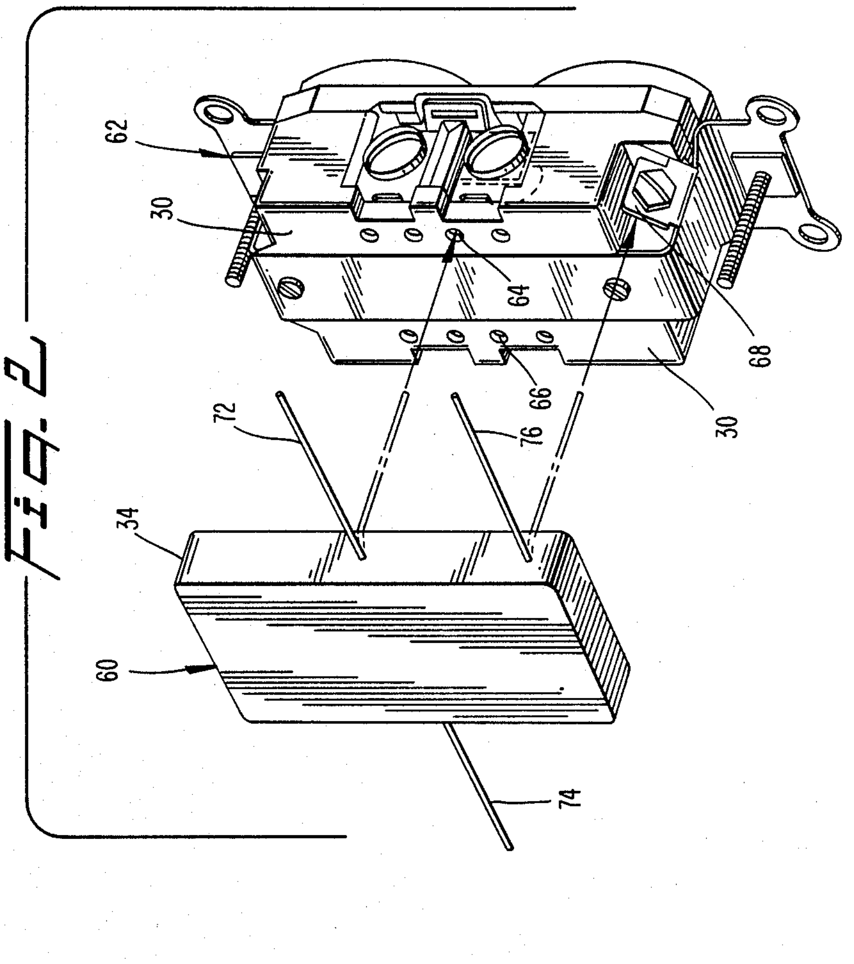
FIG. 2 is a perspective view of a second embodiment of a surge protection device according to the present invention and another electrical outlet, the surge protection device being adapted for mounting to the electrical outlet.

Another preferred embodiment of the present invention comprising a device 60 for suppressing transient surges in electrical power available from a standard electrical wall outlet 62 is shown in FIG. 2. Device 60 is substantially similar to device 10 described above, but device 60 is specifically adapted for connection to an outlet of the type represented by electrical outlet 62. In particular, electrical outlet 62 is identical to electrical outlet 12 except in the manner in which leads from power line 16, or any other leads, may be connected to electrical outlet 62.

Specifically, power circuit connection terminals 64, 66 of electrical outlet 62 are located in back side portion 30 of electrical outlet 62. Terminals 64 and 66 comprise electrically conductive wire-receiving inlets which work in cooperation with sponge springs (not shown). The sponge springs are located inside back side portion 30 of electrical outlet 62 and operate to secure power line leads which are inserted in inlet terminals 64 and 66. Outlets of this type are known and generally available.

Device 60, which includes a surge protection circuit including the varistors described previously, is adapted for mounting to electrical outlet 62 in the manner described below. Leads 72, 74 and 76 of device 60 are stiff leads which are connected to the ends of varistors 38, 40 and 42 and which emerge from insulative housing block 34 in a manner allowing convenient insertion of leads 72, 74 and 76 into inlet terminals 64, 66 and allowing connection to ground terminal 68, respectively. As with the leads emerging from insulative housing block 34 of device 10, the leads emerging from insulative housing leads 72, 74 and 76 comprise the mounting means which physically mounts and electrically connects device 60 to electrical outlet 62.

Also according to the invention, the means for suppressing surges in electrical power which is located in insulative housing block 34 of either device 10 or 60 may further include means for suppressing high frequency noise. As shown in FIG. 3, means for suppressing high frequency noise comprising a capacitor 78 is connected to varistors 38, 40 and 42 such that ends of capacitor 78 are connected to leads 46 and 48 from varistors 38, 40, and 42. Other high frequency noise suppressors may also be employed without departing from the spirit or scope of the invention.

A device for suppressing electrical power surges according to the present invention also preferably includes alarm means for generating an alarm when the surge protection means of the device is no longer functioning. According to a preferred embodiment, an audio alarm device 80, as shown in FIG. 3, is connected between leads 48 and 46, and emits an audio alarm when the surge protection means is inoperative. Other types of alarms, such as light emitting diodes, could be used to provide a visual alarm signal without departing from the spirit or scope of the invention, but such alarms may require modification of an electrical outlet with which the surge suppression device is to be used.

The specific arrangements by which devices for suppressing electrical power surges in power available at an electrical outlet are not limited to the foregoing arrangements described for devices 10 and 60. The generic concept of the present invention generally encompasses thin depth, insulative housing block devices which may be mounted on the back side portion of any of a variety of electrical outlets in a manner permitting convenient placement of the device, as described, in the open space between the back side and the housing apparatus. The placement of such a device in this manner prevents ready, inadvertent removal of the device with the result that an electrical outlet is used without the benefit of surge protection. Neither does use of such a device require any modification of the electrical outlet.

It is also true that surge protection devices according to the present invention, quite unlike intermediate receptacles, do not comprise both male and female connectors. Rather, devices according to the present invention comprise male connectors in the form of, for example, stiff leads or C-connectors. As a result, devices according to the present invention may be produced more easily than intermediate receptacle surge protection devices.

Accordingly, it should be apparent to those skilled in the art that various modifications and variations may be made to the surge protection device of the present invention without departing from the scope or spirit of the invention. Thus, it is intended that the invention cover modification and variations of the invention, provided they are within the scope of the appended claims and their legally entitled equivalents.

I claim:

1. A device for suppressing transient surges in electrical power available from an electrical outlet having power circuit connection terminals, a ground terminal, a back side portion, and disposed in a housing structure, said device comprising:

an insulative housing block having a depth sufficiently thin to allow placement of said insulative housing block between said back side portion and said housing structure, the depth of said insulative housing block being defined in a direction transverse to an elongated plane through said insulative housing block, for mounting on the back side portion of the electrical outlet with said elongated plane of said insulative housing block being parallel to the back side portion of the electrical outlet;

surge protection means for suppressing the transient electrical power surges, said surge protection means being disposed within said insulative housing block; and mounting means for physically mounting said insulative housing block to the electrical outlet, and for electrically connecting said surge protection means to the power circuit connection terminals and the ground terminal.

2. The device for suppressing surges in electrical power according to claim 1, wherein said insulative housing block includes an insulative potting compound.

3. The device for suppressing surges in electrical power according to claim 1, wherein said surge protection means is a flat planar-type varistor disposed within said insulative housing block.

4. The device for suppressing surges in electrical power according to claim 1, wherein said surge protection means includes first, second, and third varistors and wherein the electrical outlet includes hot and neutral power circuit connection terminals, said first varistor being adapted for electrical connection at one end to said hot power circuit connection terminal by said mounting means and at the other end to said neutral power circuit connection terminal, said second varistor being adapted for electrical connection at one end to said hot power circuit connection terminal by said mounting means and at the other end to said ground terminal varistor, said third varistor being adapted for electrical connection at one end to said ground terminal by said mounting means and at the other end to said neutral power circuit connection terminal.

5. The device for suppressing surges in electrical power according to claim 4, wherein said surge protection means includes means for suppressing high frequency noise.

6. The device for suppressing surges in electrical power according to claim 5, wherein said means for suppressing high frequency noise is a capacitor.

7. The device for suppressing surges in electrical power according to claim 1, wherein the device further includes audio alarm means for generating an audio alarm when said surge protection means is inoperative.

8. The device for suppressing surges in electrical power according to claim 4, wherein said mounting means is adapted to physically mount and electrically connect the device to an electrical outlet having hot and neutral power circuit connection terminals and a ground terminal located on sides of the electrical outlet, said terminals including means for securing the device to said terminals.

9. The device for suppressing surges in electrical power according to claim 4, wherein said mounting means is adapted to physically mount and electrically connect the device to an electrical outlet having hot and neutral power circuit connection terminals and a ground terminal located on the back side portion of the electrical outlet, said terminals including means for securing the device.

10. A device, physically mounted on a back side portion of an electrical outlet, having power circuit connection terminals, a ground terminal and disposed in a housing structure for suppressing transient surges in electrical power available from the electrical outlet, said device comprising:

an insulative housing block having a depth sufficiently thin to allow placement of said insulative housing block between said back side portion and said housing structure, the depth of said insulative housing block being defined in a direction transverse to an elongated plane through said insulative housing block, said device being mounted on the back side portion of the electrical outlet with said elongated plane of said insulative housing block being parallel to the back side portion of the electrical outlet;

surge protection means for suppressing the transient electrical power surges, said surge protection means being disposed within said insulative housing block; and mounting means for physically mounting said insulative housing block to the electrical outlet, and for electrically connecting said surge protection means to said power circuit connection terminals and the ground terminal.

11. The device for suppressing surges in electrical power according to claim 10, wherein said insulative housing block includes an insulative potting compound.

12. The device for suppressing surges in electrical power according to clamm 10, wherein said surge protection means is a flat planar-type varistor disposed within said insulative housing block.

13. The device for suppressing surges in electrical power according to claim 10, wherein said surge protection means includes first, second, and third varistors and wherein the electrical outlet includes hot and neutral power circuit connection terminals, said first varistor is electrically connected at one end to said hot power circuit connection terminal by said mounting means and at the other end to said neutral power circuit connection terminal, said second varistor is electrically connected at one end to said hot power circuit connection terminal by said mounting means and at the other end to said ground terminal, and said third varistor is electrically connected at one end to said ground terminal by said mounting means and at the other end to said neutral power circuit connection terminal.

14. The device for suppressing surges in electrical power according to claim 13, wherein said surge protection means includes means for suppressing high frequency noise.

15. The device for suppressing surges in electrical power according to claim 14, wherein said means for suppressing high frequency noise is a capacitor.

16. The device for suppressing surges in electrical power according to claim 10, wherein the device further includes audio alarm means for generating an audio alarm when said surge protection means is inoperative.

17. The device for suppressing surges in electrical power according to claim 13, wherein said mounting means physically mounts and electrically connects the device to an electrical outlet having hot and neutral power circuit connection terminals and a ground terminal located on sides of the electrical outlet, said terminals including means for securing the device to said terminals.

18. The device for suppressing surges in electrical power according to claim 13, wherein said mounting means physically mounts and electrically connects the device to an electrical outlet having hot and neutral power circuit connection terminals and a ground terminal located on the back side portion of the electrical outlet, said terminals including means for securing the device to said terminals.

* * * * *